United States Patent
Lahood

[11] Patent Number: 6,078,441
[45] Date of Patent: Jun. 20, 2000

[54] OPTICAL DEVICE FOR PRODUCING ROTATIONAL DISPLACEMENT OF AN INCIDENT IMAGE

[76] Inventor: Michael Lahood, 957 Sturgeon Point Rd., Derby, N.Y. 14047

[21] Appl. No.: 09/312,746

[22] Filed: May 14, 1999

[51] Int. Cl.[7] .............................. G02B 5/04; G02B 3/02; G02B 13/10; G02B 27/00
[52] U.S. Cl. .................. 359/831; 359/837; 359/741; 359/720; 359/708; 359/669; 359/625
[58] Field of Search .................... 359/831, 837, 359/708, 741, 668, 669, 670, 720, 207, 211, 625

[56] References Cited

U.S. PATENT DOCUMENTS

| | | |
|---|---|---|
| 1,637,309 | 7/1927 | David . |
| 2,681,589 | 6/1954 | Dow, Jr. et al. . |
| 3,602,085 | 8/1971 | Wagner ................................. 359/831 |
| 3,885,863 | 5/1975 | Mellert ................................. 359/831 |
| 3,972,596 | 8/1976 | Baumgardner et al. ............... 359/831 |
| 4,182,564 | 1/1980 | Jurenz et al. ......................... 359/831 |
| 4,330,188 | 5/1982 | Fujibayashi et al. ................. 359/831 |
| 4,738,499 | 4/1988 | Mikami et al. ....................... 359/18 |
| 4,949,978 | 8/1990 | Berner ................................... 273/288 |
| 5,321,781 | 6/1994 | Cox . |
| 5,523,889 | 6/1996 | Bewsmer .............................. 359/831 |

FOREIGN PATENT DOCUMENTS 361473  5/1962  Switzerland .

OTHER PUBLICATIONS

Knapp, Philip. M.D., "Use of Membrane Prisms," Symposiium: Strabismus Management, vol. 79, Sep.–Oct. 1975, pp. 718–721.

*Primary Examiner*—Ricky D. Shafer
*Attorney, Agent, or Firm*—Hodgson Russ Andrews Woods & Goodyear LLP

[57] ABSTRACT

An array of graduated prisms disposed in a circle for rotating an incident image, the prisms are disposed with their end faces at the periphery of the circle and their apices at the center. The end faces are all oriented in the same direction either clockwise or counterclockwise, depending on the direction of rotation.

20 Claims, 3 Drawing Sheets

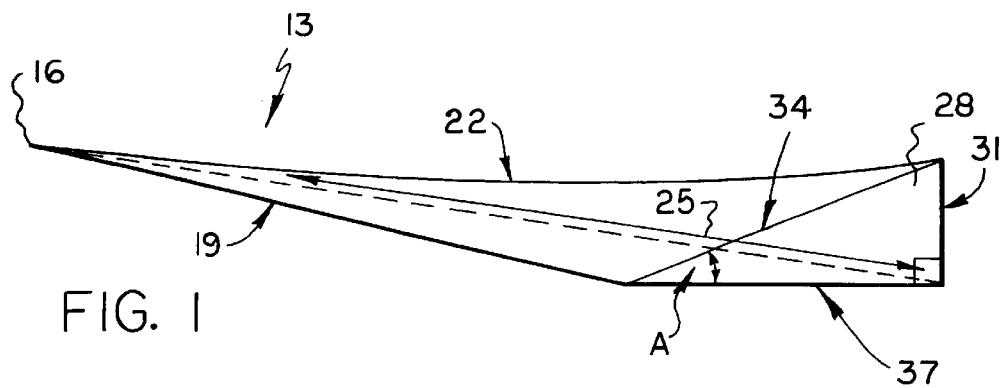
FIG. 1
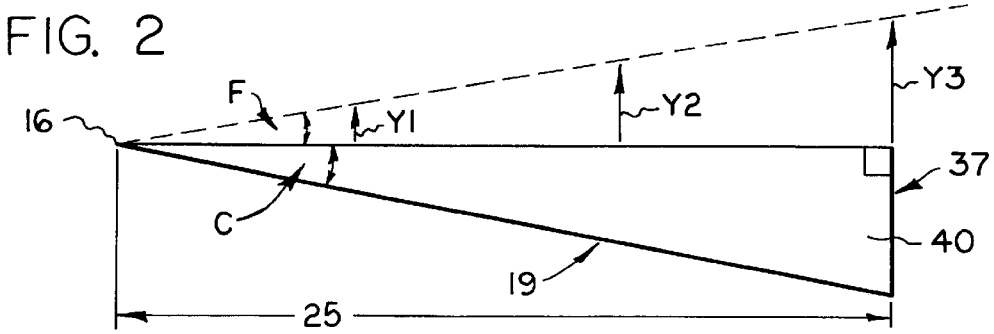
FIG. 2
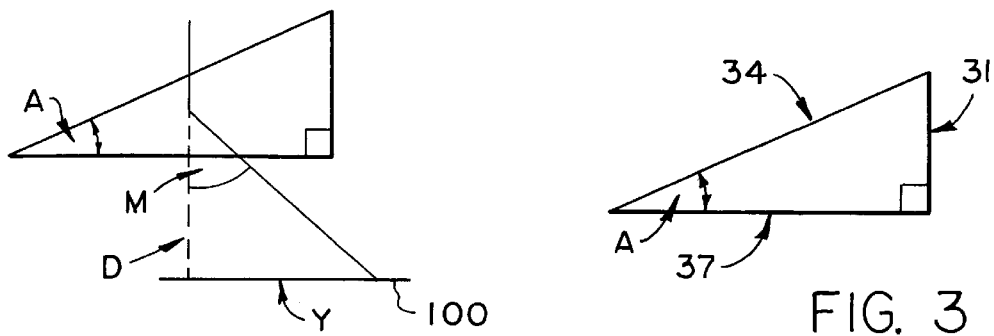
FIG. 4
FIG. 3
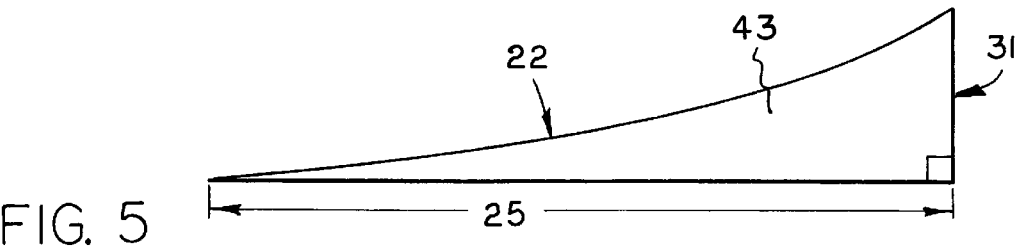
FIG. 5

OPTICAL DEVICE FOR PRODUCING ROTATIONAL DISPLACEMENT OF AN INCIDENT IMAGE

FIELD OF INVENTION

The present invention relates to optical devices and more particularly to optical devices that are capable of producing rotation of an incident image.

BACKGROUND OF THE INVENTION

There is a need for a device capable of rotating an image by or within a device. Examples of situations where such a device could be used include the treatment, diagnosis, or measurement and characterization of cyclotropia (a type of strabismus in which one or both eyes are rotated from their normal orientations); devices intended to demonstrate or simulate cyclotropia to patients, patients' families, health care practitioners and students, or the general public; novelty devices which as part of their effect or as their intended purpose rotate an image which is being viewed; or any simple or complex optical device which as part of its function involves rotation of an image in or by said device.

SUMMARY OF THE INVENTION

The present invention meets the above described need by providing an array of graduated prisms (prisms that vary in prismatic power along their length) arranged so as to produce rotation of an incident image. The array of prisms or "cycloprism" as defined hereinafter is designed to cause an image which is incident to it to be rotationally displaced a predetermined number of degrees when the image subsequently is projected onto a second surface located a predetermined distance beyond the cycloprism. The direction and amount of rotation depend on the power and orientation of the prisms and the separation between the cycloprism and the second surface.

BRIEF DESCRIPTION OF THE DRAWINGS

The invention is illustrated in the drawings in which like reference characters designate the same or similar parts throughout the figures of which:

FIG. 1 is a perspective view of a graduated prism;

FIG. 2 is a plan view of the bottom surface of the prism;

FIG. 3 is an end elevational view of the graduated prism;

FIG. 4 is an end elevational view illustrating the path of incident light through the prism;

FIG. 5 is a rear elevational view of the graduated prism;

DETAILED DESCRIPTION OF THE PREFERRED EMBODIMENT

Figure 6:
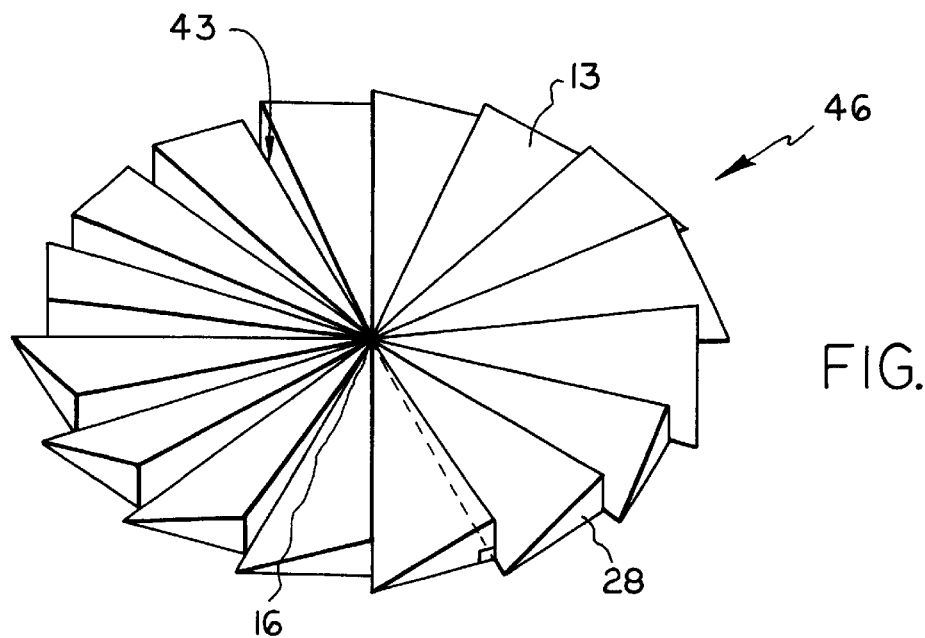
FIG. 6 is a perspective view of the optical device of the present invention.
Figure 7:
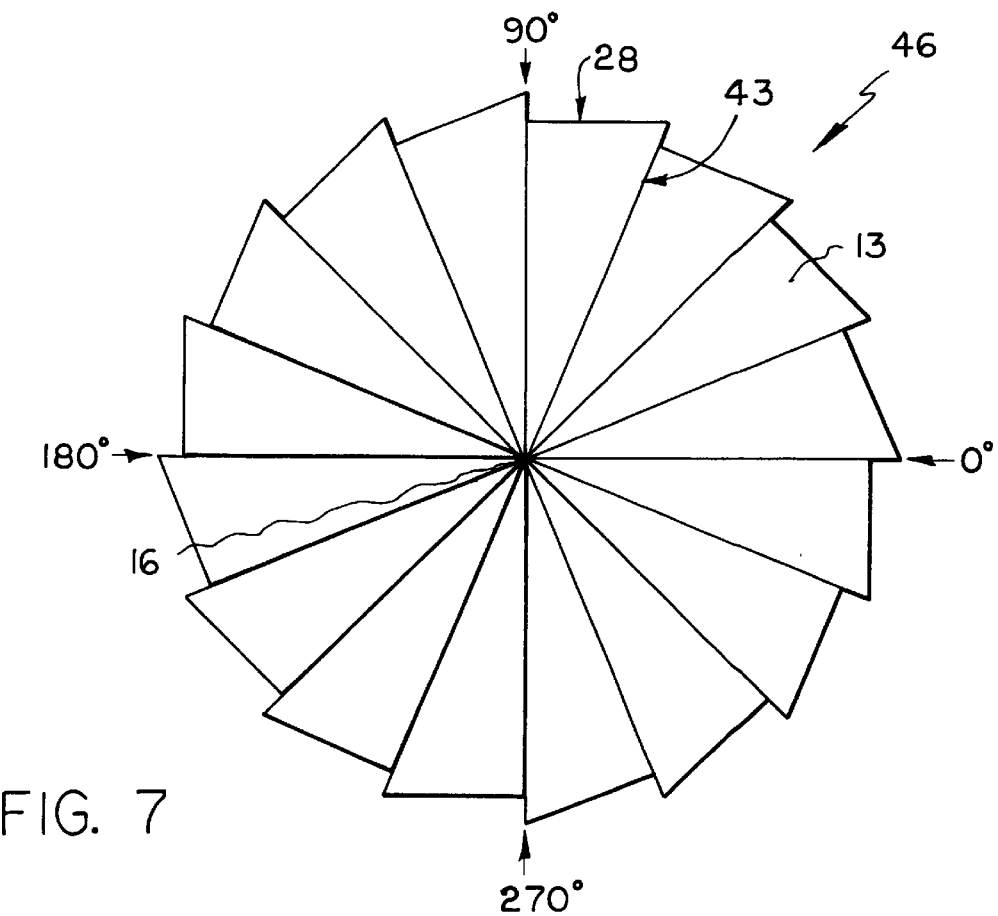
FIG. 7 is a top plan view of the optical device of the present invention.

In FIG. 1, a graduated prism 13 increases continuously in prismatic power from the point 16 formed by the intersection of first edge 19, second edge 22, and third edge 25 to the end face 28 enclosed by fourth edge 31, fifth edge 34, and sixth edge 37. Edges 31, 34, 37, 25, and 19 are preferably straight lines. Edges 31 and 37; 31 and 25; and 37 and 25; preferably intersect at right angles. Angle C is formed by the intersection of edges 25 and 19 (best shown in FIG. 2). Apex angle A is formed by the intersection of edges 34 and 37. Edge 22 is a curve described by the equation $B=(X_D \tan C) \tan [2 \arctan ((X_D \tan F)/D)]$. This equation is derived hereinafter.

Three of the four surfaces in FIG. 1 are planar surfaces; the fourth, that bounded by edges 19, 22 and 34, is a complex geometric surface determined by the contour of edge 22 which is determined by the equation for B above.

Turning to FIG. 2, Angle C is formed by the intersection of edges 25 and 19. Edges 25 and 37 form a right angle. Y is the displacement of an incident ray of light that intercepts the graduated prism 13 perpendicular to the bottom surface 40. The prism 13 is designed to vary in power from left to right such that the prismatic power at the left end is zero and the power at the right end is at a maximum. Y1, Y2, and Y3 represent the prismatic displacement of incident points of light at various places along the prism. To deviate a line image, which is parallel to X (depicted in FIG. 2 as 25) and for which each point is incident to the prism 13 normal to the bottom surface, by a given amount such as F. degrees (shown in FIG. 2), would require that the prism be constructed so as to have power $Y=X_D \tan F$, where $X_D$ is the distance along edge 25 from the point 16 of the prism.

Referring to FIGS. 3 and 4, an incident ray of light is shown with its incident path and a proposed deviated path. Y is the amount of the displacement, and M is the angle of deviation. M is given by the equation $M=\arctan (Y/D)$. For any cross-sectional triangle parallel to the end face 28, there would be a unique value for M corresponding to the prismatic power at that location along the graduated prism 13. For a graduated prism 13 with continuously changing power, there would theoretically be an infinite number of cross-sectional prisms. If, instead, the graduated prism were constructed in step-wise fashion, there would be a finite number of prismatic powers corresponding to the number of steps designed into the length of the graduated prism. The present invention is based on a design incorporating graduated prisms 13 of continuously changing prismatic power and, therefore, edge 22 is described by a smooth curve.

In FIG. 5, the back surface 43 of the graduated prism 13 is shown and corresponds to what would be termed the prism base in optics terminology.

Turning to FIG. 6, a "cycloprism" is an array 46 of radially oriented, contiguously placed graduated prisms 13 with their end surfaces 28 oriented in the same direction (in this case, with the apex angle A oriented clockwise to the base edge of the end surface).

In operation the rotation of an image can be accomplished by rotating each of several parts of the image. Rotation of a single incident line can be simulated by displacing each point of the line perpendicularly an amount that would cause each of those points to lie on a different line which forms an angle with the original line.

In FIG. 2, an image line that coincides with edge 25 or is parallel to edge 25 can be displaced onto a line that forms angle F with edge 25 by displacing each point of the incident line by an amount, $Y=X_D \tan F$. A prismatic component capable of producing such an effect would have to have prismatic power that varies from zero at one end to a maximum amount at the opposite end according to the same formula.

It is a well-established principle that for prismatic devices involving small apex angles and small angles of prismatic deviation from the apex angle, the apex angle is almost precisely twice the angle of deviation if the index of refraction of the material is 1.5.

Therefore, in FIG. 4, A=2M.

Since tan M=Y/D, and therefore M=arc tan Y/D, then A=2 arc tan Y/D. Because Y=$X_D$ tan F, A=2 arc tan [($X_D$ tan F)/D]

In FIG. 2, $R_D$=$X_D$ tan C, where $R_D$ equals the magnitude of edge 37 for a given distance $X_D$ along edge 25.

In FIG. 3, $B_D$=$R_D$ tan A, where $B_D$ equals the magnitude of edge 31.

Therefore, $B_D$=($X_D$ tan C) tan [2 arc tan (($X_D$ tan F)/D)]

Figure 8:
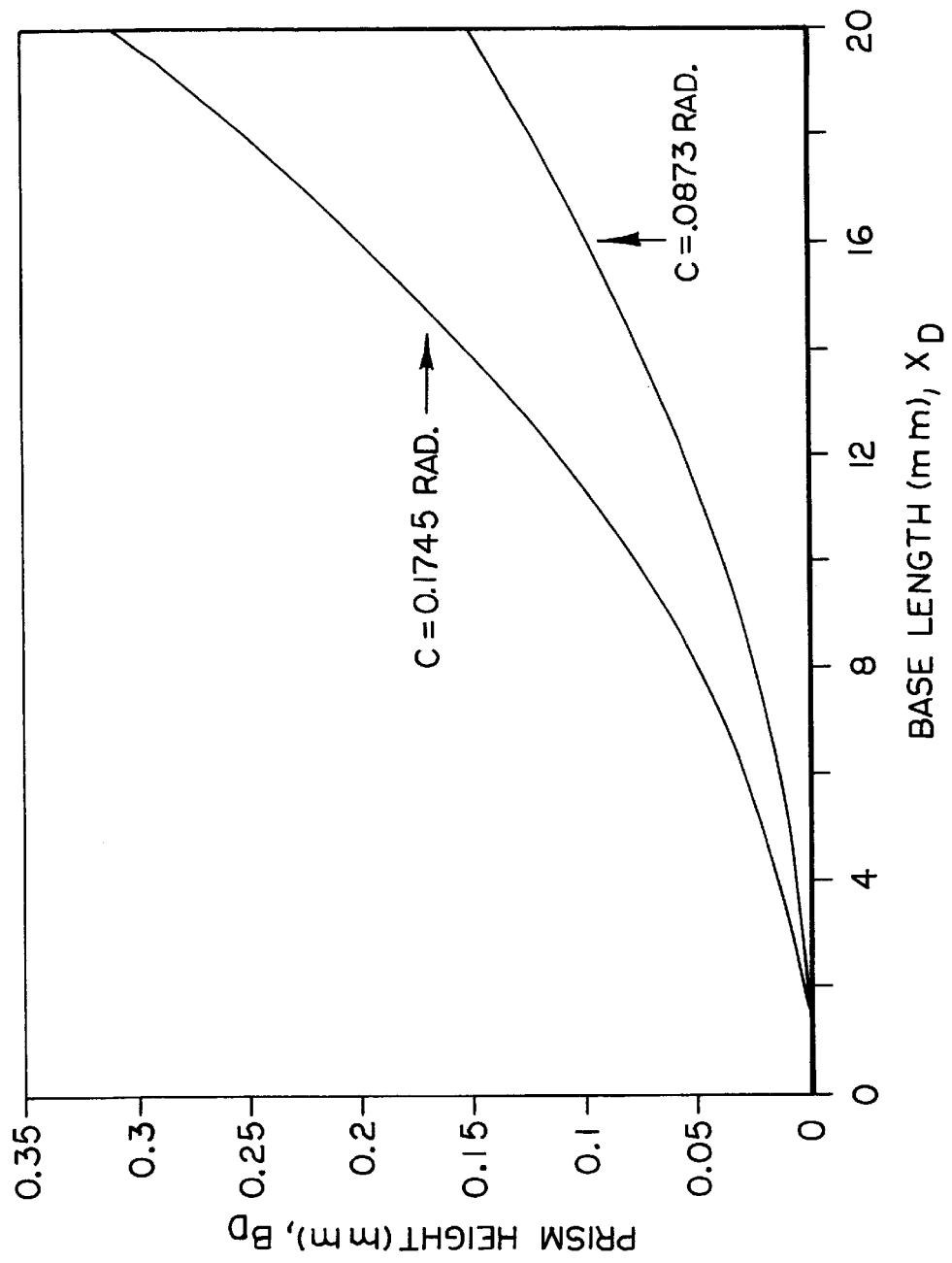
FIG. 8 is a graph of the prism height (B) vs. the base length (X) for two different values of the angle (C).

In FIG. 8, the graph plots the above equation for $B_D$ for two different values of C and a single value of F. The contour of the curve would define the shape of edge 22 for a graduated prism having given values of C, D, and F. In FIG. 8, the abscissa, "Prism Height (mm)" corresponds to $B_D$ and the ordinate, "Base Length (mm)" corresponds to $X_D$.

A prismatic component, such as that depicted in FIG. 1, having an edge 22 given by the final equation for $B_D$ above would have prismatic power that varies from the left point to the right end face according to the relationship, Y=$X_D$ tan F. An incident image line parallel to edge 25 and intercepting the graduated prism with each of its rays normal to the face bordered by edges 19, 25 and 37 would be displaced onto a line that forms an angle F with the incident line. The incident line would thus have been effectively rotated by F. degrees when it strikes a second surface 100 at a distance D (best shown in FIG. 4) from the bottom surface of the graduated prism.

An array of identical graduated prisms arranged as described for FIG. 6 would rotate an incident image F. degrees. This effect results from the simulated rotation of the parts of the whole image by each of the graduated prisms in the array. The aggregate array is referred to as a "cycloprism." The component graduated prisms are arranged radially with the vertex of angle C of each graduated prism located centrally and the end faces 28 located on the periphery. The bottom surfaces as defined by FIG. 2, are contiguous with one another, with edge 25 of one element adjacent to edge 19 of the contiguous element. The aggregate array that constitutes a cycloprism can be structured "base clockwise" or "base counterclockwise" depending on the intended direction of rotation.

The cycloprism can be manufactured from optical grade materials with an optical grade plastic being preferred. Size, prism power and orientation, material, and shape would depend on the specific application. Application specific parameters would include the amount of rotation desired, whether the desired rotation is to be clockwise or counterclockwise, and the desired distance between the cycloprism and the final image plane.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. An apparatus for rotating an incident image, comprising:
   a plurality of graduated prisms disposed in a circular array, the prisms varying continuously in power from a first power at the center of the array to a greater second power at an outer edge of the array.

2. The apparatus of claim 1, wherein the first power substantially equals zero.

3. The apparatus of claim 1, wherein each of the prisms further comprises a first edge, a second edge, a third edge, a fourth edge, a fifth edge, and a sixth edge.

4. The apparatus of claim 3, wherein each of the prisms increases in power from a first point where the first edge, the second edge, and the third edge intersect to a second point where the fourth edge, the fifth edge, and the second edge intersect.

5. The apparatus of claim 4, wherein the intersection of the first edge and the third edge defines an angle (C).

6. The apparatus of claim 5, wherein the intersection of the fifth edge and the sixth edge defines an angle (A).

7. The apparatus of claim 6, wherein the first edge, the third edge, the fourth edge, the fifth edge, and the sixth edge are substantially linear.

8. The apparatus of claim 7, wherein the fourth edge and the sixth edge intersect at a right angle.

9. The apparatus of claim 8, wherein the fourth edge and the third edge intersect at a right angle.

10. An apparatus for rotating an incident image, comprising:
    a plurality of graduated prisms disposed in a circular array, the prisms varying in power from a first power at the center of the array to a greater second power at an outer edge of the array; and,
    wherein each of the prisms comprises a first edge, a second edge, a third edge, a fourth edge, a fifth edge, and a sixth edge; each of the prisms increasing in power from a first point where the first edge, the second edge, and the third edge intersect to a second point where the fourth edge, the fifth edge, and the second edge intersect; the intersection of the first edge and the third edge defining an angle C; the intersection of the fifth edge and the sixth edge defining an angle A; the first edge, the third edge, the fourth edge, the fifth edge, and the sixth edge being substantially linear; the fourth edge and the sixth edge intersecting at a right angle; and the fourth edge and the third edge intersecting at a right angle.

11. The apparatus of claim 10, wherein the sixth edge and the third edge intersect at a right angle.

12. The apparatus of claim 11, wherein a line image parallel to the third edge is capable of being rotated an angular distance F by each of the prisms.

13. The apparatus of claim 12, wherein an incident ray normal to a bottom surface bordered by the third edge, the sixth edge, and the first edge, is displaced by a distance (Y) that varies depending on the distance ($X_D$) along the third edge according to Y=$X_D$ tan F.

14. The apparatus of claim 13, further comprising a second surface located at a distance (D) from the bottom surface.

15. The apparatus of claim 14, wherein the second edge is described by a curve defined by ($X_D$ tan C) tan [2 arc tan (($X_D$ tan F)/D)].

16. The apparatus of claim 13, wherein the prisms have a planar surface defined by the fifth edge, the sixth edge, and the fourth edge disposed along the periphery of the circular array.

17. The apparatus of claim 16, wherein the planar surfaces are oriented in the same direction.

18. The apparatus of claim 16, wherein the bottom surfaces of adjacent prisms are disposed such that the third edge of each of the plurality of prisms abuts with the first edge of the adjacent prism.

19. A method of rotating an incident image comprising the steps of:

providing a plurality of graduated prisms disposed in a circular array, the prisms having a first power at the center of the array and a second power that is greater than the first power at an outer edge of the array, the prism power varying continuously between the center of the array and the outer edge;

providing a second surface disposed at a distance from the plurality of prisms such that an image passing through the prisms is capable of being displayed on the second surface; and projecting the image through the plurality of prisms onto the second surface.

20. An apparatus for rotating an incident image, comprising:

a plurality of graduated prisms disposed in a circular array, each of the prisms having at least one curved edge, a first linear edge having a magnitude ($X_D$), a second linear edge intersecting the first edge, an angle (C) formed between the first and second edges, a second surface disposed at a distance (D) from the array, the prisms displacing the incident points of an image line by a distance Y from the first edge to form a displaced line, the distance Y varying along the first edge, the displaced line intersecting with the first edge to form a pre-determined angle F, the distance Y defined by $X_D \tan F$, the curved edge defined by $(X_D \tan C) \tan [2 \arctan ((X_D \tan f)/D)]$.

* * * * *